United States Patent
Rizo Morente et al.

(10) Patent No.: US 10,404,185 B2
(45) Date of Patent: Sep. 3, 2019

(54) THREE PHASE MEDIUM VOLTAGE POWER CONVERSION SYSTEM FOR CLOSED-LOOP APPLICATIONS

(71) Applicant: GAMESA INNOVATION & TECHNOLOGY, S. L., Sarriguren (Navarra) (ES)

(72) Inventors: Mario Rizo Morente, Madrid (ES); Alvar Gonzalo Mayor Miguel, Madrid (ES); Andres Agudo Araque, Madrid (ES)

(73) Assignee: SIEMENS GAMESA RENEWABLE ENERGY INNOVATION & TECHNOLOGY, S. L., Sarriguren (Navarra) (ES)

( * ) Notice: Subject to any disclaimer, the term of this patent is extended or adjusted under 35 U.S.C. 154(b) by 0 days.

(21) Appl. No.: 15/454,044

(22) Filed: Mar. 9, 2017

(65) Prior Publication Data
US 2017/0272004 A1   Sep. 21, 2017

(30) Foreign Application Priority Data

Mar. 15, 2016   (ES) .................................. 201600194

(51) Int. Cl.
*H02M 1/084*   (2006.01)
*H02M 7/487*   (2007.01)
*H02M 1/12*   (2006.01)
*H02M 1/00*   (2006.01)

(52) U.S. Cl.
CPC ........... *H02M 7/487* (2013.01); *H02M 1/084* (2013.01); *H02M 1/12* (2013.01); *H02M 2001/0012* (2013.01)

(58) Field of Classification Search
CPC ............ H02M 1/12; H02M 1/34; H02M 5/08; H02M 7/487; H02M 7/527; H02M 7/5345; H02M 3/34; H02M 1/084
See application file for complete search history.

(56) References Cited

U.S. PATENT DOCUMENTS

| | | | | |
|---|---|---|---|---|
| 5,886,888 | A * | 3/1999 | Akamatsu | H02J 3/01 363/65 |
| 2012/0163057 | A1* | 6/2012 | Permuy | H02M 7/487 363/131 |
| 2016/0315540 | A1* | 10/2016 | Dilley | H02M 3/158 |
| 2017/0077704 | A1* | 3/2017 | Faley | H02J 3/14 |

OTHER PUBLICATIONS

"Optimal Predictive Control of Three-Phase NPC Multilevel Converter for Power Quality Applications" Barros et al.. IEEE Oct. 2008.*

* cited by examiner

*Primary Examiner* — Jue Zhang
*Assistant Examiner* — Lorena D Bruner
(74) *Attorney, Agent, or Firm* — Ladas &Parry LLP

(57) ABSTRACT

A three phase medium voltage power conversion system for closed-loop applications comprising a 3L-NPC converter. The switching system of the 3L-NPC converter is based on SHE-PWM patrons. The regulation system of the 3L-NPC converter comprises a controller and an interface module between the controller and the switching system which is configured for supplying to the switching system voltage reference samples at a rate L times faster than the rate of voltage reference samples managed by the controller.

6 Claims, 1 Drawing Sheet

THREE PHASE MEDIUM VOLTAGE POWER CONVERSION SYSTEM FOR CLOSED-LOOP APPLICATIONS

FIELD OF THE INVENTION

The invention relates to power conversion systems for closed-loop applications.

BACKGROUND OF THE INVENTION

Currently, the available hardware technology for Medium Voltage (MV) power converters (>1000 v) drastically limits the switching frequency in comparison with the Low Voltage (LV) level, and thus, it degrades the power quality.

In order to optimize the power quality with minimum switching frequency and fulfill existing standards with MV power converters, the prior art suggests combining high order filters, multilevel converter technologies and Selective Harmonic Elimination-Pulse Width Modulation (SHE-PWM).

In particular the three level Neutral-Point-Clamped (3L-NPC) converter, where the three voltage levels are achieved by a DC bus divided into two capacitors connected in series, is considered to be a suitable topology for MV power converters.

While MV power conversion systems for open-loop applications are known, the electric industry increasingly demands MV power conversion systems for closed-loop applications.

This invention is addressed to the attention of that demand.

BRIEF DESCRIPTION OF THE INVENTION

The invention provides a three phase MV power conversion system, comprising a 3L-NPC converter, for coupling, in a close-loop mode, a power consuming device to a power source.

The switching system of the 3L-NPC converter is based on SHE-PWM patrons for optimizing the power quality with minimum switching frequency.

The regulation system of the 3L-NPC converter comprises a controller and an interface module between the controller and the switching system which is configured for supplying to the switching system voltage reference samples at a rate L times faster than the rate of voltage reference samples managed by the controller.

The controller is configured accordingly to a novel Equalization Model (EM) of the 3L-NPC converter with the SHE-PWM patrons.

Other desirable features and advantages of the invention will become apparent from the subsequent detailed description of the invention and the appended claims, in relation with the enclosed drawings.

DETAILED DESCRIPTION OF THE INVENTION

Figure 1:
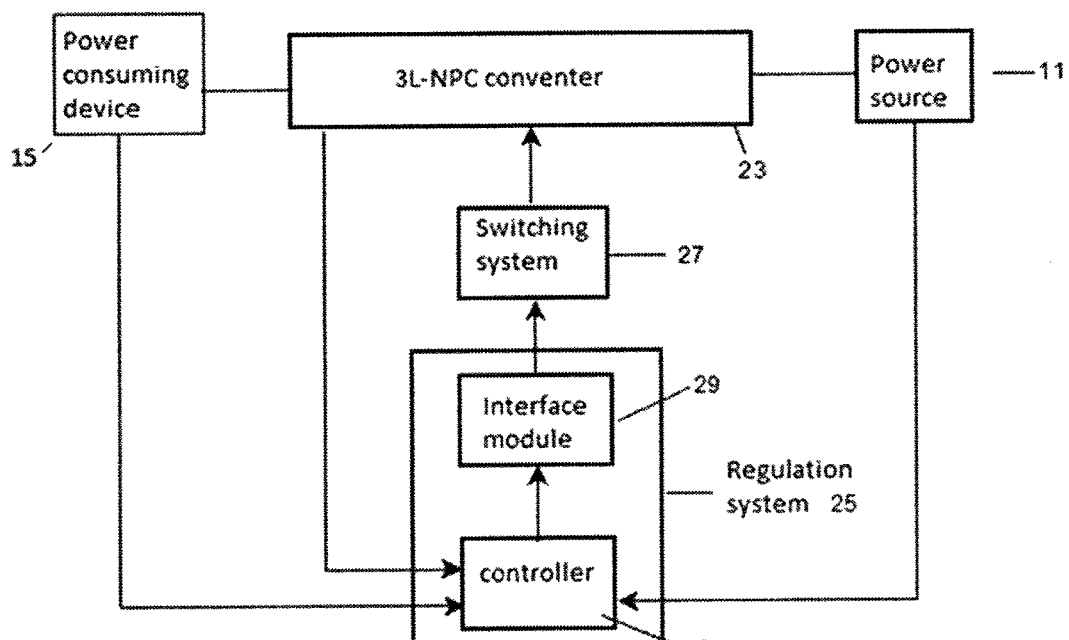
FIG. 1 is a block diagram of a MV three phase power conversion system for coupling, in a close-loop mode, a power consuming device to a power source according to the invention.

The three phase MV power conversion system 13 of the invention comprises:

a power consuming device 15 (such as an utility grid or a motor);
a power source 11 (such as a wind turbine or an utility grid);
a 3L-NPC converter 23 having a regulation system 25, comprising a controller 21 and an interface module 29, and a switching system 27.

The switching system 27 is based on SHE-PWM patrons for optimizing the power quality with minimum switching frequency.

In closed-loop applications SHE-PWM addresses some technical difficulties which are not present in open-loop applications.

Firstly, the harmonic cancellation capacity depends on the accuracy of the switching and this is tightly subject to the rate of actuation of the controller 21. Increasing the actuation rate in a closed-loop system leads to a higher analog to digital conversion and execution rate. Generally, available resources in digital control platform do not allow this extra computation burden. In the case of open-loop applications the voltage reference is directly obtained and no controller is needed, so the computation load is inexistent.

Secondly, the two DC capacitors of the 3L-NPC converter 23 shall be charged with similar voltages, otherwise premature failure of switching device, equipment trip and degraded power quality are expected. The non-linear nature of the SHE-PWM does not allow the application of conventional equalization techniques.

In order to break the trade-off between harmonic elimination and high computation weight, the power conversion system 13 comprises an interface module 29 between the switching system 27 and the controller 21 that predicts L−1 samples of the voltage reference from each sample received from the controller 21. This way the switching system 27 is supplied with an L-times faster rate of samples whereas the controller 21 is just executed once. The execution load is then alleviated L times and the harmonic elimination performance not only is not degraded but it is improved.

Figure 2:
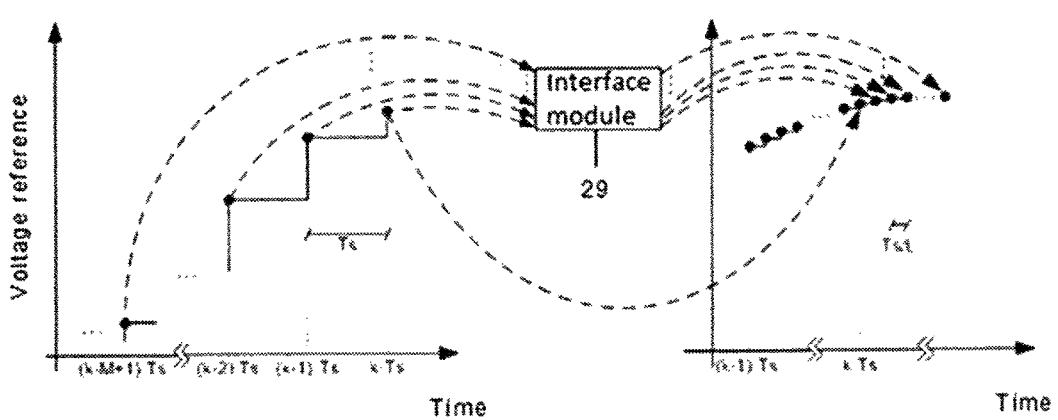
FIG. 2 illustrates the operating principle of the interface module of the invention.

FIG. 2 illustrates the operating principle of the interface module 29 that executes a prediction algorithm based on historic information wherein the extra L−1 samples of the voltage reference are calculated through an extrapolation of a given number M of previous samples supplied by the controller 21, L and M being natural numbers. The value of L is upper-limited by the prediction accuracy, which is directly related to the harmonic cancellation. The value of M is upper-limited by the system dynamics.

In the left side of FIG. 2 are shown the values of the voltage references of the M samples supplied by the controller 21 to the interface module 29 at times (k−M+1)×Ts, . . . , (k−2)×Ts, (k−1)×Ts, k×Ts, being k a time measure and Ts the sampling interval of the controller 21.

In the right side of FIG. 2 are shown the values of the voltage references of the L−1 samples predicted by the interface module 29 for the time intervals beginning at times (k−1)×Ts and k×Ts (the current instant), taking into account, for each time interval, the evolution of the values of the voltage reference of the previous M samples.

The L−1 samples are uniformly distributed along the controller's sampling interval Ts.

The interface module 29 also deals with the undesired imaging phenomenon, common in oversampling processes, and its influence over the regulation is totally modeled in order to guarantee the correct performance.

The interface module 29 allows working with almost analog sampling rates in the switching system 27 while control routine is executed in controller 21 with common rate, so a typical digital control board is just enough. This way the harmonic cancellation capacity reaches the maximum imposed by the 3L-NPC converter 23 and power quality is actually optimized with low switching frequencies.

Regarding the equalization of the DC capacitors voltages of the 3L-NPC converter 23 having a switching system 27 based on SHE-PWM patrons, the controller 21 is configured attending to the Equalization Model (EM) approach. The EM is constructed by studying the injection and feedback of the Second Order Negative Sequence (SONS). A SONS current is naturally injected by the 3L-NPC converter 23 itself, every time a voltage unbalance occurs. The controller 21 detects it and inserts a SONS voltage that modifies the previous current. The iteration of the SONS current with the SHE-PWM switching pattern has a direct impact on the voltage difference between DC capacitors. With the help of the EM, it is possible to configure the controller 21 to assure a stable equalization, increase the process dynamics and control the transient injection of extra sequences.

The application of the invention covers MV based distributed power generation systems and other fields like mining, pumps or MV drives.

The main advantage of the invention is that not only makes feasible the use of a switching system 27 based on SHE-PWM patrons with a 3L-NPC converter 23 in closed-loop applications but also bring the performance to the optimum limit. The proposed power conversion system 13 is therefore highly competitive in terms of costs and efficiency.

Although the present invention has been described in connection with various embodiments, it will be appreciated from the specification that various combinations of elements, variations or improvements therein may be made, and are within the scope of the invention.

The invention claimed is:

1. A three phase Medium Voltage (MV) power conversion system for coupling, in a close-loop mode, a power consuming device to a power source through a three level Neutral-Point-Clamped (3L-NPC) converter having a regulation system with a controller and a switching system, wherein:
   the switching system is based on Selective Harmonic Elimination-Pulse Width Modulation (SHE-PWM) patterns; and
   said power conversion system further comprises an interface module between the controller and the switching system, wherein the interface module comprises means for predicting voltage reference values for L−1 (L minus one) samples based on factors consisting of a defined number M of reference samples previously supplied by the controller and a voltage reference value of each of the M number of reference samples previously supplied at a defined sample time interval of the controller from an initial time k, representing a time when a first of the M number of reference samples was supplied by the controller, to a current time,
   wherein the switching system is supplied with an L-times faster rate of the previously supplied reference samples and wherein the controller is executed just once to supply the predicted voltage reference values for the L−1 samples such that harmonics in a load produced by the system is reduced as compared with harmonics that would be produced in the load if the controller were executed multiple times to supply voltage reference values for each of the L−1 samples.

2. The three phase Medium Voltage (MV) power conversion system according to claim 1, wherein the 3L-NPC converter comprises two DC capacitors and wherein the controller is configured with an Equalization Model (EM) approach for injecting a Second Order Negative Sequence (SONS) current in the 3L-NPC converter when voltages of the two DC capacitors are not balanced, iteratively in order to balance the voltages.

3. A three phase Medium Voltage (MV) power conversion system, comprising
   a power consuming device;
   a three level Neutral-Point-Clamped converter (3L-NPC converter);
   a regulation system, the regulation system comprising a controller and an interface module;
   a switching system, the switching system is based on Selective Harmonic Elimination-Pulse Width Modulation (SHE-PWM) patterns; and
   a power source
   wherein the power consuming device is connected with the controller and with the 3L NPC converter,
   wherein the interface module receives samples of voltage reference from the controller, and a sampling interval of the controller is Ts,
   wherein the interface module comprising means for predicting voltage reference values for L−1 (L minus one) samples based on factors consisting of a defined number M of reference samples previously supplied by the controller and a voltage reference value of each of the M number of reference samples previously supplied at a defined sample time interval of the controller from an initial time k, representing a time when a first of the M number of reference samples was supplied by the controller, to a current time, and wherein the interface module sends to the switching system samples of the voltage reference at a rate L times as fast as a sampling rate of the controller, whereby reducing harmonics in an execution load L times, where L−1 is a number of additional samplings performed in the sampling interval (Ts) of the controller.

4. The three phase Medium Voltage (MV) power conversion system according to claim 3, wherein the interface module supplies to the switching system L−1 samples for each of the samples of voltage reference received from the controller that are generated according to a predictive model based on historic information.

5. The three phase Medium Voltage (MV) power conversion system according to claim 4, wherein the 3L-NPC converter comprises two DC capacitors and wherein the controller is configured accordingly with the Equalization Model (EM) approach for injecting a Second Order Negative Sequence (SONS) current in the 3L-NPC converter when voltages of the two DC capacitors are not balanced, iteratively in order to balance the voltages.

6. The three phase Medium Voltage (MV) power conversion system according to claim 3, wherein the 3L-NPC converter comprises two DC capacitors and wherein the controller is configured with an Equalization Model (EM) approach for injecting a Second Order Negative Sequence (SONS) current in the 3L-NPC converter when voltages of the two DC capacitors are not balanced, iteratively in order to balance the voltages.

* * * * *